United States Patent [19]

Stephenson et al.

[11] 3,781,497
[45] Dec. 25, 1973

[54] SEAT BELT BUCKLE PLUNGER TYPE SWITCH AND HOUSING CONTAINING BELT LATCH MECHANISM

[75] Inventors: Robert L. Stephenson, Sterling Heights; Yogendra S. Loomba, Roseville, both of Mich.

[73] Assignee: Allied Chemical Corporation, Morristown, N.J.

[22] Filed: Oct. 12, 1972

[21] Appl. No.: 297,137

[52] U.S. Cl. ...... 200/61.58 B, 200/16 B, 200/159 A
[51] Int. Cl. ........................................ H01h 13/62
[58] Field of Search.................. 200/16 B, 61.58 B, 200/61.76, 61.8, 61.81, 159 A, 162, 163; 180/82 C; 307/10 SB; 340/52 E; 297/385

[56] References Cited
UNITED STATES PATENTS

| 2,996,587 | 8/1961 | McCarthy | 200/61.58 B |
| 3,710,048 | 1/1973 | Schumacher | 200/16 B X |
| 3,060,285 | 10/1962 | Steinbruner | 200/16 B |
| 3,133,277 | 5/1964 | Hood | 200/61.58 B X |
| 3,147,819 | 9/1964 | Keleher | 200/61.58 B X |
| 3,269,483 | 8/1966 | Garner, Jr. | 200/61.58 B X |
| 3,449,714 | 6/1969 | Farley, Jr. | 307/10 SB X |
| 3,624,601 | 11/1971 | Routzahn | 307/10 SB X |

Primary Examiner—J. R. Scott
Attorney—Jonathan Plaut et al.

[57] ABSTRACT

A vehicle seat belt buckle adapted for use in a warning system comprising in combination a buckle with slot for receiving a tongue in locking engagement, which tongue upon insertion into the buckle depresses a plunger switch either from a closed circuit position to an open circuit position or from an open circuit position to a closed circuit position, as desired. The plane surface of the tongue maintains the plunger switch in the depressed position until said tongue is unlatched and withdrawn from the buckle.

19 Claims, 5 Drawing Figures

SEAT BELT BUCKLE PLUNGER TYPE SWITCH AND HOUSING CONTAINING BELT LATCH MECHANISM

BACKGROUND OF THE INVENTION

1. Field Of the Invention

This invention relates to a warning system having particular application for seat belt and harness assemblies of the type utilized in automobiles for retaining an occupant in a seated position within the automobile at the moment the wearer is exposed to the forces which develop when the automobile is involved in a collision.

The protective value of such safety belts and harness assemblies is beyond question but their protection obviously depends on their being used. Many individuals forget to use them. Some drivers are reluctant to insist that their passengers use them, and many individuals consider them a nuisance and deliberately ignore them.

The present invention provides a seat belt buckle adapted for use in a warning system, to alert the driver if he or any of his passengers are not using their safety belts. The switch employed in this buckle, and its position with respect to the tongue, is such as to provide excellent reliability. It is positioned to act positively once the tongue is thrust into locking engagement with the latch of the buckle and to be maintained in a depressed condition by contact with the plane surface of the tongue until the tongue is removed.

If a switch is placed at the end of travel of a tongue it would fail to operate if the tongue employed were too short. It would also be susceptible to damage by an overthrust of the tongue and could lose its bias as a result of several such overthrusts.

An outstanding feature of the switch incorporated into the buckle of the present invention is that it may readily be assembled so as either to open a closed circuit when the tongue is inserted or to close an open circuit.

2. Description of the Prior Art

Most modern seat belts are retractable, having take-up reels of one design or another. Most warning signals are activated by electric switches which are built into these take-up reels; thus, when a certain amount of the belt is withdrawn from the take-up reel the system "assumes" that the belt is being properly used and the switch is placed in open position, cutting off the signal. It can be seen then, that if the belt is withdrawn and knotted to prevent retraction, the system becomes inoperative. Other means of activating warning systems have been suggested, but have not met with substantial commercial success.

SUMMARY OF THE INVENTION

The present invention relates to a vehicle seat belt buckle adapted for use in a warning system which comprises a housing, a slot in the housing for receiving a tongue, means for attaching the buckle and tongue to a seat belt, latching means within the buckle for engagement with the tongue, guide means within the housing for channeling the tongue into position for latching engagement with the buckle, means for releasing the tongue and a biased electric plunger switch with a terminus of the plunger extending into the path of the tongue when the tongue is inserted in the buckle. With this arrangement, when the tongue is inserted into the buckle it will depress the plunger, with the terminus of the depressed plunger in contact with a plane surface of the tongue. The plunger will therefore remain in the depressed condition in contact with the plane surface of the tongue until the tongue is removed, permitting the biased plunger to return to its extended position.

In the present invention the plunger switch is disposed in an opening in the buckle housing, and the plunger is biased to extend into the channel through which the tongue passes when inserted for locking engagement.

When the switch is assembled, a removable conducting ring may be positioned in either one of two positions as desired. In a first position the switch provides a closed circuit when the plunger if fully extended by its bias and when it is depressed, it will provide an open circuit. Alternately, it may be assembled with the conducting ring in a second position to provide an open circuit when the plunger is in its extended position and a closed circuit when depressed. In the buckle of the present invention, the plunger switch is disposed in an opening in the buckle housing so that the motion of the plunger is in a direction substantially perpendicular to a plane face of the tongue. As the tongue is inserted into the buckle, the leading edge depresses and passes over the portion of the plunger which extends into its channel, thereby changing the switch from a first position to a second position and holding it in a second position by its plane surface. Two biased electric contacts fabricated of flexible metal strips make contact at two different points on the surface of the plunger. More specifically, these contacts are simultaneously in contact with two points on a single segment of the plunger which may be either conductive or non-conductive. Hence, when the conductive segment is contacted by the two flat strips, the circuit is closed by the conductive segment between them, and conversely, when the non-conductive segment is contacted by the two flat strips at two different points, the circuit is broken by the non-conductive segment.

Preferably, the conductive and non-conductive segments comprise perforate discs, rings or sections which can be slipped over the plunger's core, so that as the plunger moves from a first position to a second position, the two contact members press against a conductive segment or a non-conductive segment depending on their relative position on the plunger's core.

The advantage of the buckle of the present invention may be better understood by reference to the following detailed description, when considered in connection with the accompanying drawings.

DETAILED DESCRIPTION OF THE INVENTION

Figure 1:
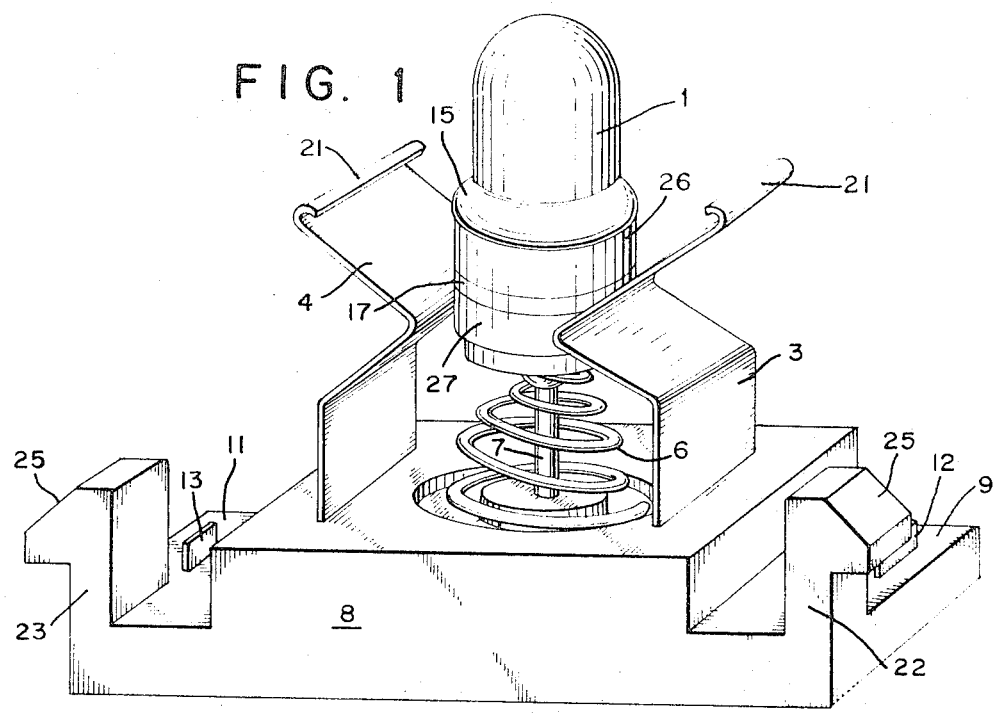
FIG. 1 is an enlarged perspective drawing of the switch mounted on a non-conductive base.

Referring now to the drawings where like numerals indicate like or corresponding parts throughout the several views.

Figure 2:
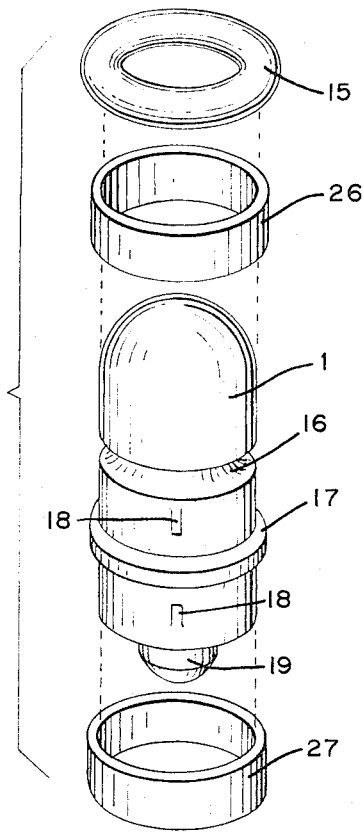
FIG. 2 is an exploded view of the plunger assembly showing the plunger core with a flange which separates the conducting and non-conducting rings, and a circumferential groove for the retention of an O-ring. These rings and O-rings are shown as removed from the plunger's core.
Figure 3:
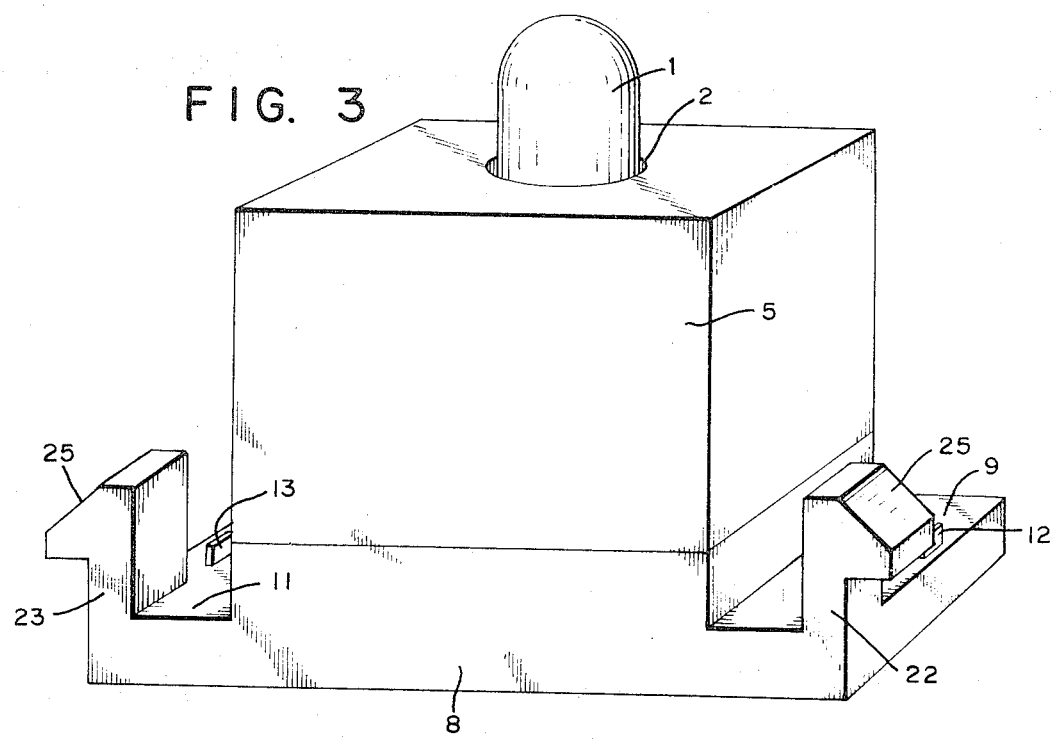
FIG. 3 is the switch and base of FIG. 1 with the switching mechanism enclosed in a case having an opening at the top through which the terminus of the plunger extends. The cover can be cemented to the base, and the complete assembly snapped into an opening in the housing so that the terminus of the plunger extends into the channel for the tongue.
Figure 4:
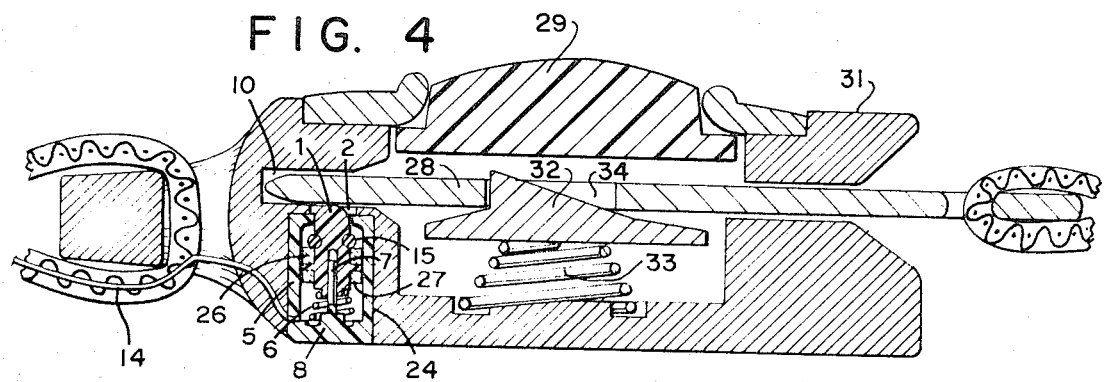
FIG. 4 is a cross-sectional drawing of a typical buckle, illustrating one embodiment wherein the switch is inserted into an opening in the bottom of the buckle housing. In this illustration the tongue has been inserted into the buckle. It is securely latched and the switch is held in its depressed position by the plane surface of the tongue. Sections of belting are shown attached both to the tongue and to the buckle, and a laminated film containing two conducting strips is shown embedded in the belt attached to the buckle, said conducting strips also being connected to the contact members of the switch.

With reference to the drawing of FIG. 1 particularly, but also to the drawings of FIGS. 2, 3, 4, and 5 numeral 1 is the plunger arranged for reciprocating motion along its longitudinal axis. This plunger may be maintained in longitudinal alignment by the opening 2 (FIGS. 3 4) and 5, by the spring contacts 3 and 4, by sidewall 5 (FIG. 3) and that opposite, as well as by biasing spring 6. Additionally, if desired, the plunger may have an internal longitudinal opening to cooperate with a projecting guide rod 7 extending from base 8. In the preferred embodiment shown, contact strips 3 and 4 are embedded in non-conducting base 8 and pass through the substance of said base to emerge on extending surfaces 9 and 11 as terminals 12 and 13. These terminals are in contact with conductor 14 (FIG. 4). These conductors are preferably thin ribbons or deposits of conductive metal, sandwiched between two layers of plastic film. In preparing these flexible conductors the conductive metal may, if desired, be applied to a layer of film such as the polyethylene terephthalate film MYLAR, by a printing technique such as that used in preparing printed circuit boards. The second layer of polymeric film may then be placed over the conducting ribbons, and the sandwich laminated to thus completely insulate them. These conductors pass through the belting connected to the buckle and are carried to any point desired, such as to a seat belt retractor for connection into a signal circuit. In the preferred embodiment shown, an O-ring 15 of pliable material such as rubber or neoprene is placed in circumferential groove 16 (FIG. 2) just below the terminus of plunger 1, so as to act as a cushion stop against the inner circumference of opening 2 within case 5 (FIG. 3). The O-ring therefore limits the distance to which the terminus of plunger 1 extends into the tongue's channel 10 (FIG. 4).

The plunger's core 1 is preferably fabricated of a tough polymeric material such as nylon or DELRIN (the acetal resin $(-OCH_2-)_n$ derived by the polymerization of formaldehyde). If desired, the core may be made of metal, but in such a case it would be preferable to cap the plunger's terminus with a non-conductive cap to prevent grounding the unit, should the latched buckle contact the frame of the vehicle. As shown in FIG. 2, the plunger preferably presents a sloping or a rounded terminus to the inserted tongue, although, if the leading edge of the tongue is sloped upwardly toward the plunger's terminus, the shape of said terminus would not be critical. It is important, however, that the shape of either the tongue, or preferably the plunger's terminus, be such that the force applied by the tip of the tongue to said terminus at the moment of insertion, although applied substantially at right angles to the longitudinal axis of the plunger, will nevertheless readily depress the biased plunger. A rounded terminus is preferred, as shown in the drawing.

In the preferred embodiment, the plunger's core 1 has integrated therewith a flange 17 for retaining the upper ring, particularly if it is decided to assemble the switch with only the conducting ring. Small wedges or latches 18 on the surface of the core are also preferred to cooperate with the rings 26 and 27 to lock them to the core. These wedges also serve to prevent rotation of the rings, although in the case of a cylindrical plunger, such rotation would present no problem.

The preferred plunger core 1 also has at the end adjacent to the biasing means 6, a circular channel and/or a centrally disposed raised portion 19 for retaining an end of the biasing means, preferably a coiled spring 6.

Although a cylindrical plunger is shown, it could as well have a rectangular cross section, or be cylindrically shaped with two opposing flattened surfaces. The latter has the advantage of offering a larger surface for the electrical contacts 3 and 4, and is a preferred embodiment.

Contacts 3 and 4 provide a wiping contact to the segments of the plunger, and an advantage of the preferred embodiment lies in the fact that the plunger presents a continuous surface to the contacts throughout the range of its reciprocal motion, hence, the contacts remain substantially equidistant at all times.

Although this switch is very small, it is rugged and if required, can handle a substantial flow of current. This is particularly true if the contacts are used in conjunction with a plunger having flattened sides.

Since the contacts remain parallel, arcing and pitting is avoided, and the wiping action maintains clean contact surfaces.

Although the strip contacts are biased toward the plunger, an added feature of the present invention lies in the fact that the ends 21 of these contact strips press against the inside wall surface of cover 5, thereby considerably increasing their bias. This provides excellent electrical contact. It is preferable to curl the ends of the contact strips so they make slideable contact with the inside walls of the cover.

These contacts are preferably fabricated of spring brass, phosphor bronze, or other suitable flexible conducting material. In the preferred embodiment, the base has a centrally disposed depression or alternately a raised portion to position the biasing spring in axial alignment with the plunger.

As previously stated, cover 5 may be slipped over base 8, with strip contacts 3 and 4 preferably pressed against its end walls. It can be fastened to the base by any suitable means, with O-ring 15 biased against the edge of opening 2 and the rounded terminus of plunger 1 protruding therethrough. Preferably, an adhesive is employed to attach the cover to the bias. The cover and the base are preferably fabricated of a suitable polymeric material, polypropylene being quite satisfactory.

FIG. 3 shows cover 5 attached to base 8. The strip contacts, the lower section of which are sealed in the base, emerge therefrom at the surface of extending members 9 and 11 at points 12 and 13. These emerging terminals are attached, preferably within the buckle housing, to flexible metal conductors which lead to the belting and thence to any point required, for inclusion in a single circuit.

Two flexible catches 22 and 23 are shown as an integral part of the base, with their heads extending somewhat beyond the ends of the base itself. When the encased switch assembly is pressed into opening 24 of FIG. 4, these catches bend inwardly by virtue of their flexibility, as their sloping heads 25 encounter the edge of the opening in the buckle. The flexible shanks of these catches are of such length with respect to the thickness of the metal base of the buckle, or the depth of appropriate cavities within the housing, that when the assembly is pressed into the opening, with the terminus of the plunger extending into the channel for the tongue, and with the bottom of base 8 flush with the bottom of the buckle housing as in FIG. 4, the heads of the catches spring back to permanently engage the inner surface of the cavity.

If desired, the distance between the base, and the under surface of the head of the catch can be made a few thousandths of an inch less than the distance between the surface of the buckle and the inner surface with which the catch is to cooperate. Since the head is forced back when the switch unit is inserted, it will spring over the inner surface of the cavity, and maintain tension to prevent any subsequent looseness of the switch unit in the buckle regardless of wear and temperature changes.

FIG. 4, which shows the switch inserted into a seat belt buckle 31 with the tongue 28 maintaining the switch in the depressed position, is a cross section taken longitudinally through the center of the buckle. For this reason it does not show the linkage between the push button 29 and the latch mechanism 32 of the buckle, for the linkage would be on each side of the center section.

In this figure, biasing means 33 urges latch 32 into engagement with opening 34 in the tongue.

Figure 5:
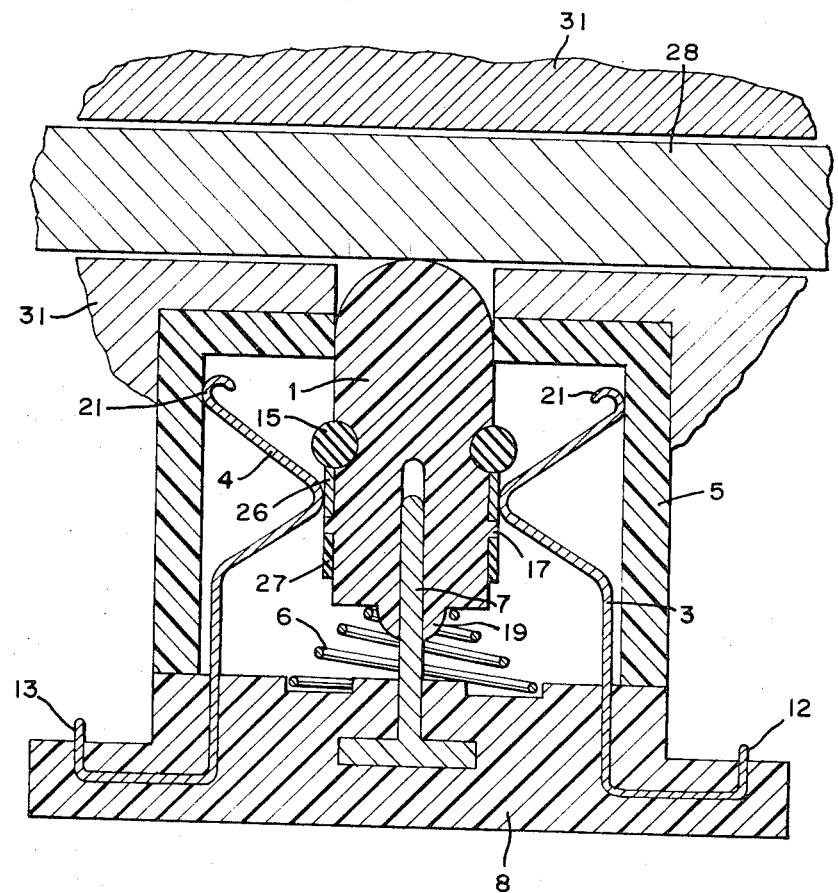
FIG. 5 is an enlarged transverse sectional drawing of the switch of FIG. 4, wherein the plunger is depressed by the tongue into a closed circuit position through conductive ring 26. The section is taken through guide rod 7, perpendicularly to the cross-section of FIG. 4.

FIG. 5 is a transverse section through guide rod 7, and illustrates the position of the various components when the switch is activated by the tongue. In the drawing, tongue 28 has been inserted into buckle 31, a section of which is shown. The act of insertion has forced plunger 1 downward over guide rod 7 against the bias of coiled spring 6, and the tongue thereafter maintains the plunger in this position until withdrawn from the buckle. Spring contact strips 3 and 4, previously pressed against non-conducting ring 27, are now in contact with conducting ring 26. When the tongue is removed, the plunger will extend upwardly because of its biasing means 6, with its rounded terminus extending into the channel for the tongue. It will be stopped in its upward travel by O-ring 15 striking the inner surface of enclosing case 5. Non-conductive ring 27 is thereby moved up to contact spring strips 3 and 4, hence the electrical terminals 12 and 13 are again in their open circuit position. This switch is applicable to substantially any type of buckle, particularly die cast buckles, whether operated by push button or lever. Seat belt buckles of this type are described in more detail in co-pending U. S. Pat. application "Safety Belt Buckle," U.S. Ser. No. 151,039, filed on June 8, 1971, incorporated herein by reference.

It has been emphasized that in the present invention the switch may be assembled to operate from an open to a closed circuit position, or from a closed to an open circuit position. If, for example, the conductive ring is placed directly beneath the O-ring, then when the tongue has not been inserted in the buckle, and the plunger is fully extended into the tongue's channel, the contacts will be pressed against the lower, non-conductive ring. Actually, this ring can be eliminated if desired without altering the response of the switch. The contacts would then be pressed against the non-conductive plunger core, and when the plunger is depressed the contacts would be forced outward by the shoulder formed by the larger diameter conducting ring. When the switch is thus assembled, either with or without the addition of a non-conductive ring, the switch will be in open position unless the tongue is inserted. With this arrangement, a signal light or other electrical signal device can be activated when the buckle is in use (tongue latched in place). If a relay is incorporated into the circuit, this action can be reversed, with the relay in inactive position permitting the flow of current to the signal device, and cutting off the current flow when activated.

If the conducting ring is placed in the lower position adjacent to the biasing spring, and the non-conducting ring — or no ring at all, is placed just beneath the O-ring, the reverse situation holds. The switch is in closed circuit position when the buckle is not buckled, thus activating a light, buzzer or other electric signal to alert the driver to the fact that one or more buckles are not being properly used. As before, a relay could be used to reverse the response, if desired. In most warning signal circuits the signal circuit also depends on the ignition key being in the "on" position, and on the operation of a weight-sensitive switch in the seat cushion served by the seat belt buckle under consideration. Thus, the switch of this invention may be assembled for either on-off or off-on operation without causing appreciable drain of the vehicle's battery.

Many modifications or variations of the present invention are possible in light of the above teachings. It is, therefore, to be understood that within the scope of the appended claims, the invention may be practiced otherwise than as specifically described.

We claim:

1. A vehicle safety seat belt for use in a warning system to alert the driver that the safety seat belt has not been buckled, which comprises:
   a. a buckle housing connected to a first section of belting, said belting being attached to the vehicle;
   b. a tongue connected to a second section of belting, said belting being attached to the vehicle;
   c. an opening in said buckle housing into which said tongue is inserted;
   d. latching means within said buckle housing for engaging and locking the tongue when inserted in said opening in the buckle housing;
   e. guide means within said buckle housing for channeling said tongue into position for latching engagement with said latching means;
   f. release means in said housing for release of said latching means to permit said tongue to be withdrawn from said buckle housing; and g. a biased electric plunger switch having an extended position and a depressed position mounted in said buckle housing with the terminus of the plunger of said switch extending into the path of said tongue when the tongue is inserted into said buckle housing, such that when the tongue is inserted it will depress the plunger of said switch with the terminus of the depressed plunger in contact with a plane surface of the tongue, the plunger remaining in depressed condition in contact with the plane surface of said tongue until the tongue is withdrawn from said buckle housing, permitting the biased plunger to return to its extended position.

2. A vehicle safety seat belt for use in a warning system to alert the driver that the safety seat belt has not been buckled, which comprises:
   a. a buckle housing connected to a first section of belting, said belting being attached to the vehicle;
   b. a tongue connected to a second section of belting, said belting being attached to the vehicle;
   c. an opening in said buckle housing into which said tongue is inserted;
   d. latching means within said buckle housing for engaging and locking the tongue when inserted in said opening in the buckle housing;
   e. guide means within said buckle housing for channeling said tongue into position for latching engagement with said latching means;
   f. release means in said housing for release of said latching means to permit said tongue to be withdrawn from said buckle housing;
   g. a biased electric plunger switch having an extended position and a depressed position mounted in said buckle housing with the terminus of the plunger of said switch extending into the path of said tongue when the tongue is inserted into said buckle housing, such that when the tongue is inserted, it will depress the plunger of said switch, with the terminus of the depressed plunger in contact with a plane surface of the tongue, the plunger remaining in depressed condition in contact with the plane surface of said tongue until the tongue is withdrawn from said buckle housing, permitting the biased plunger to return to its extended position; and
   h. said terminus being shaped to present a sloping surface to said inserted tongue, whereby, when the tongue is inserted, its incoming tip acts upon the sloping surface of the terminus of the plunger to depress the plunger, and the surface of the inserted tongue maintains the plunger in the depressed condition, thus activating or deactivating an electrical signal in said warning system.

3. The vehicle safety seat belt buckle of claim 2 wherein the sloping surface presented to the inserted tongue is a rounded terminus of the plunger.

4. The vehicle safety seat belt buckle of claim 2 wherein said switch comprises a biased plunger having a conducting segment and two spaced flexible conductors biased for frictional contact with the segment when the plunger is in a first position and out of contact with the conducting segment in a second position.

5. The vehicle safety seat belt of claim 2 wherein said biased electric plunger switch
   a. an enclosure for said plunger switch having an opening at one end for the extending terminus of said switch, and two spaced flexible conductors passing from two points outside the enclosure to two points within said enclosure;
   b. a plunger within said enclosure positioned for motion along its longitudinal axis between a first position wherein the sloping terminus extends into the path for said tongue in said buckle housing, and a second position wherein the terminus does not extend into said path, but is held by its bias against the plane surface of said tongue when the tongue is latched within said buckle housing;
   c. said plunger having two segments, one being electrically conductive and one being non-conductive;
   d. said two spaced flexible conductors biased for frictional contact with said segments of the plunger, so disposed that both flexible conductors are in frictional contact with one segment when the plunger is in the first position; and both conductors are in frictional contact with the other segment when the plunger is in the second position, said plunger making parallel longitudinal lines of frictional contact with the two spaced flexible conductors throughout its movement from the first position to the second position;
   e. biasing means urging said plunger in the direction wherein the sloping terminus of the plunger extends into the path of said tongue, whereby, when the tongue has not been inserted into the buckle housing, said flexible conductors make contact with one segment of the plunger which may be either conducting or non-conducting, and when said tongue is inserted into said buckle housing for latching engagement therein, said plunger is depressed so that said flexible conductors slide to contact another segment, being either electrically conductive or non-conductive whichever is opposite to the conductivity of the segment previously contacted.

6. The vehicle safety seat belt buckle of claim 5 wherein said two spaced flexible conductors at the point where they enter said enclosure extend upwardly and are curved inwardly toward said plunger to contact its surface, then outwardly toward the wall of said enclosure, thus forming an area of contact in the curve of the flat strip maintained in continuous wiping frictional contact with the surface of said plunger, said contact of each strip being at one or two different points on one segment for the first position of the plunger, and at two different points on the other segment for the second position of the plunger.

7. The vehicle safety seat belt buckle of claim 5 wherein said flexible conductors make frictional contact with the plunger and said segments contained thereon, along parallel plane surfaces.

8. The vehicle safety seat belt buckle of claim 5 wherein said bias urging said plunger to its extended position is a coiled spring retained in longitudinal alignment with the plunger.

9. The vehicle safety seat belt buckle of claim 5 wherein the portion of the plunger which is in contact with the two spaced flexible conductors is cylindrical.

10. The vehicle safety seat belt buckle of claim 9 wherein the portion of the plunger which is in contact with said two spaced conductors comprises a central core on which are disposed two perforated discs or rings, one being an electrically conductive segment and the other a non-conductive segment of said plunger, for contact with the spaced flexible conductors, whereby when both conductors contact said conductive ring, the circuit between said two conductors is closed by the conductive segment, and when both conductors contact the non-conductive ring as a result of a change in position of said plunger, the circuit between them is open.

11. The vehicle safety seat belt buckle of claim 10 wherein said conducting and non-conducting segments of the plunger are removable and interchangeable, so that said switch may be assembled for either an open circuit or a closed circuit in the undepressed position of the plunger, with the circuit being in an oppositely opened or closed condition when the plunger is depressed by said tongue.

12. The vehicle safety seat belt buckle of claim 10 wherein that portion of said plunger which carries said segments has a greater diameter than said opening in said enclosure through which the terminus of the plunger extends, and wherein there is a circumferential groove about said plunger, at a point where a smaller diameter terminus of the plunger adjoins said larger diameter portion carrying said perforated discs, said circumferential groove being fitted with an elastic O-ring, whereby as the biasing means urging the plunger upward until the terminus enters said path for said tongue, it is stopped by the O-ring striking the edge of the opening.

13. The vehicle safety seat belt buckle of claim 5 wherein said two spaced flexible conductors comprise two flat strips of spring metal, each having one terminus at the surface of said extending members of said base of the enclosure for the plunger switch, and each passing through the substance of said base to emerge from its surface within the enclosure beside said plunger.

14. The vehicle safety seat belt buckle of claim 13 wherein the other termini of said flat strips of spring metal are in slideable contact with the inner wall of said enclosure to thus intensify the bias toward the plunger.

15. The vehicle safety seat belt buckle of claim 5 wherein said enclosure for said plunger switch is fabricated of insulating material and comprises:
 a. a base, having centrally located in its upper surface, structure for positioning said biasing means;
 b. a cover for said base having a top and sidewalls but open at the bottom for fixed attachment to the base, thereby forming an enclosure for said plunger and said two spaced flexible conductors, said cover having an opening through which the terminus of said plunger may slideably extend;
 c. said base being sized to extend a short distance beyond the sidewalls of said cover on two sides, thus producing an extending member on each of two sides of the enclosure; and
 d. means for fastening the enclosure within said opening in said buckle housing so that the bottom of the base is substantially flush with the surface of said housing.

16. The vehicle safety seat belt buckle of claim 15 wherein said base has incorporated into its upper surface, at least two upwardly extending flexible shafted catches, the heads of which extend beyond the end of said base, said heads having upwardly, inwardly sloping faces extending from a point beyond the end of the base to a point within the longitudinal dimension of said base, whereby, when said switch is pressed into said opening in said buckle housing, the catches, because of their flexible shafts and their sloping heads as they contact the edge of the opening, bend inwardly to pass into the opening, until the projecting heads reach a point above the inner surface of a cavity in said buckle housing, whereupon the heads snap into the cavity, locking said switch in place.

17. The vehicle safety seat belt buckle of claim 15 wherein the connection between said buckle housing and the fixed ends of said belting is made by means of two flexible parallel bands of metallic film laminated between two strips of flexible plastic film, said metallic film having a thickness of between about 0.05 to 0.00025 inch, and wherein said laminated conductors are imbedded within said belting attached to said buckle housing.

18. The vehicle safety seat belt buckle of claim 15 wherein said base has, centrally disposed on its upper surface, an upwardly projecting rod, normal to the plane of the base, which passes through said biasing means to slideably cooperate with a centrally disposed corresponding longitudinal opening extending from the bottom of the plunger toward said rounded terminus thereof, said rod and corresponding opening being of such length as to guide the plunger in its longitudinal reciprocating motion.

19. The vehicle safety seat belt buckle of claim 18 wherein said extended rod and corresponding longitudinal opening of said plunger, has a non-circular cross section to prevent rotation of said plunger on said rod.

* * * * *